…

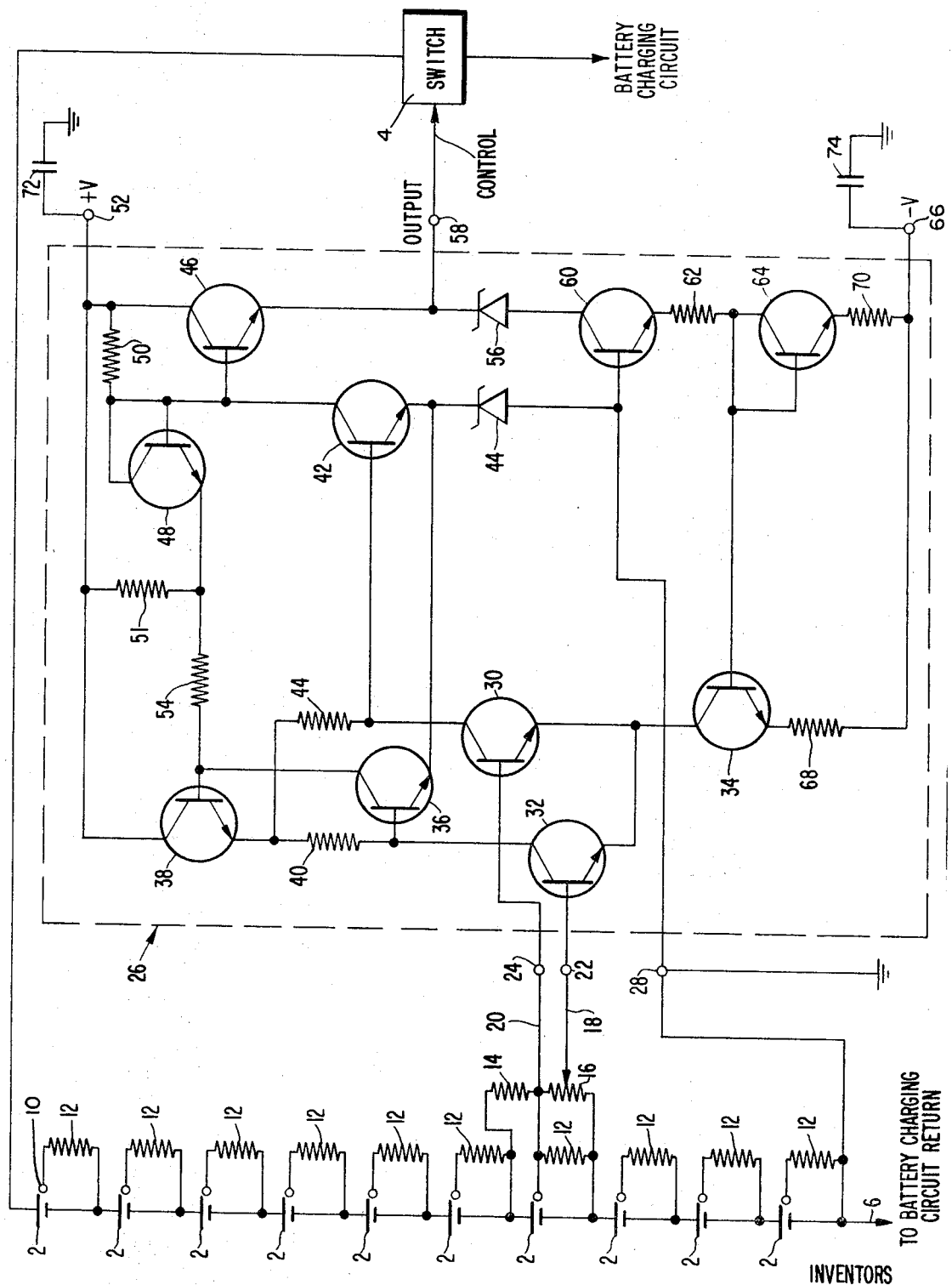

United States Patent Office 3,539,899
Patented Nov. 10, 1970

---

3,539,899
THIRD ELECTRODE SENSING CIRCUIT FOR ON-OFF BATTERY CHARGING
James D. Dunlop, Gaithersburg, and Ronald W. Bounds, Baltimore, Md., assignors to Communications Satellite Corporation, a corporation of Washington, D.C.
Filed Aug. 9, 1968, Ser. No. 751,412
Int. Cl. H02j 7/04
U.S. Cl. 320—46          7 Claims

ABSTRACT OF THE DISCLOSURE

A circuit for controlling charging of Nickel-Cadmium secondary cells by applying the total cell voltage of a selected cell and the third-electrode (adhydrobe) signal voltage to a differential comparator having an "on" or "off" output dependent on the relative magnitudes of the compared voltages, so that the comparator operates a switch in the charging circuit to interrupt charging when the signal from the adhydrode, proportional to the state of charge of the cell, reaches a predetermined level.

BACKGROUND OF THE INVENTION

The invention relates generally to battery charge control and more particularly to apparatus for sensing the third-electrode signal voltage of Nickel-Cadmium batteries to control charging.

Prior art battery charging schemes include temperature sensing devices that monitor the increasing cell temperature as the fully charged condition is reached. This approach suffers from obvious inherent inaccuracies, particularly when rapid charging is desired.

In the field of Nickel-Cadmium secondary cells, a third-electrode or adhydrode has been used to aid in charge sensing. As the cell approaches its fully-charged state, oxygen evolution begins at the Nickel electrode. Because the adhydrode produces an electrical signal proportional to the partial pressure of oxygen within the cell, sensing of that signal provides a good indication of the battery charge condition. Accurate charge control using the low amplitude (about 200 mv.) adhydrode signal, however, has ordinarily required complex circuitry to achieve high stability and sensitivity.

One prior art solution applies the adhydrode signal to a transformer in order to control the AC impedance (by a reflected impedance effect) in a voltage divider circuit that controls a switching transistor. This arrangement obviously requires an AC supply source which may not be readily available, particularly in operation of a spacecraft.

Another prior art approach is to apply directly the adhydrode signal to the coil of a sensitive relay that operates a circuit controlling the charging circuit. Accuracy depends largely on the pull-in reliability of the relay.

Still another prior art scheme is to amplify the adhydrode signal and sense the amplified signal by a Schmitt trigger that controls the charging circuit. The accuracy of this device depends chiefly upon the constancy of the amplifier gain and the Schmitt trigger sensing level.

SUMMARY OF THE INVENTION

Accordingly, objects of the present invention are to provide a more accurate charge control apparatus to thereby minimize overcharging and pressure build-up in Nickel-Cadmium secondary cells to achieve better life expectancy of the cells while allowing rapid recharging and deep discharging. Accuracy is enhanced by comparing the adhydrode signal with a reference voltage from the same cell, thus providing stable sensing insensitive to temperature and cell variations with time. In addition, by comparing two voltages in a device having a very narrow switching range, accuracy is greatly increased with respect to prior art threshold detecting devices. Moreover, the sensitivity of the present invention does not vary with input levels. Also the invention is of low weight and is not complex.

The present invention is particularly useful for spacecraft applications where power systems are critical to life expectancy.

Briefly, in accordance with one embodiment of the invention, these and other objects are attained by providing in a battery charging system the combination of a differential comparator arranged to receive a reference voltage derived from a voltage divider connected across a Nickel-Cadmium secondary cell and to compare that reference voltage with a battery charge sensing signal voltage derived from the adhydrode (third-electrode) of the cell, so that the comparator provides a logical "on" or "off" output signal depending on the relative magnitudes of the input signals. The comparator output controls a switch to connect or interrupt the battery charging circuit.

BRIEF DESCRIPTION OF THE DRAWING

A more complete appreciation of the invention and many of the attendant advantages will be readily appreciated by reference to the following detailed description when considered in connection with the accompanying drawing wherein the solitary figure is a schematic diagram, partially in block form, of a preferred embodiment of battery charge control circuit.

DESCRIPTION OF THE PREFERRED EMBODIMENT

The figure shows an embodiment of the circuit of the present invention. A bank of series-connected batteries 2 are shown connected between a switch means 4 and a terminal 6 connectible to the negative terminal of a battery charging supply (not shown). Switch means 4, to be described more hereinafter is operable to connect the positive end of the bank of batteries 2 to the positive terminal of a battery charging supply (not shown). Batteries 2 are preferably of the Nickel-Cadmium type having a third-electrode or adhydrode 10. Each battery 2 has a low-valued resistor 12 connected between the adhydrode 10 and the negative (Cadmium) electrode. A resistor 14 and potentiometer 16 are arbitrarily connected across any of the batteries 2, for example, the second from the negative end of the series string. As will be more fully apparent hereinafter, the potentiometer 16 rider provides an adjustable reference voltage on line 18 for use in a comparison with the voltage appearing on line 20 produced by adhydrode electrode 10. Lines 18 and 20 are connected to terminals 22 and 24 of a differential comparator 26 that, by way of example, may be an integrated circuit such as the Fairchild μA710. The negative end of the series string of batteries 2 is shown connected to the system or chassis ground and to terminal 28, the ground terminal of differential comparator 28.

Differential comparator 26 may be any device capable of providing two output states or voltage levels ("on"

and "off") in response to the relative magnitudes of two input voltage signals. The circuit of differential comparator 26 shown, which taken by itself forms no part of the invention, is highly useful in this application because its switching region (between "on" and "off") is very narrow (on the order of a few millivolts), thus providing high sensitivity and accuracy.

Terminal 24 of the differential comparator 26 is connected to the base of transistor 30 and terminal 22 is connected to the base of transistor 32. Transistors 30 and 32 operate as a differential input stage to achieve low offset. The emitters of transistors 30 and 32 are connected to the collector of transistor 34 which acts as a current source to make the collector currents of transistors 30 and 32 insensitive to the common mode input voltage. The collector of transistor 32 is connected to the base of transistor 36, to the emitter of transistor 38 through resistor 40, and to the base of transistor 42 through a resistor 44. The emitters of transistors 36 and 42 are connected together and these transistors provide a balanced biasing scheme for the circuit so that the two-level output is insensitive to changes in the positive supply voltage. As the latter increases, the collector currents of transistors 36 and 42 will increase such the voltage on transistor 42 remains constant. These transistors are also connected in an emitter followed arrangement to the cathode of Zener diode 44 to give a high output current capability. The Zener diode 44 allows a large input range to the differential amplifier 26. The collector of transistor 42 is connected to the base of transistor 46 and to the base and collector of transistor 48 connected as a diode. The base and collector of transistor 48 are connected through resistor 50 to positive supply voltage terminal 52. The transistor 48 emitter is also connected to the base of transistor 38 through resistor 54. The collectors of transistors 38 and 46 are also connected to terminal 52. The emitter of transistor 46 is connected to the cathode of Zener diode 56 and the output terminal 58 and the anode of the diode is connected to the collector of transistor 60. The base of the latter transistor is connected to the anode of Zener diode 44 and to ground terminal 28 and the emitter is connected through resistor 62 to the collector and base of transistor 64 connected as a diode and to the base of transistor 34. The emitters of transistor 34 and 64 are connected to the negative supply terminal 66 through resistors 68 and 70, respectively. Zener diode 56 shifts the output to a level compatible with logic circuits. Transistor 60 isolates the output from the diode-compensated bias divider for the input stage current source. Diode-connected transistor 64 compensates for the emitter-base voltage of transistor 34, allowing the latter current source to operate with a small voltage drop across its emitter resistor 68 thus allowing a large negative input voltage limit. Bypass capacitors 72 and 74 provide an AC path to ground at terminals 52 and 66, respectively.

In typical operation $+12$ volts is applied to terminal 52 and $-6$ volts to terminal 66. Output 58 provides $-0.5$ volt when the voltage at input terminal 22 is more positive than the voltage at input terminal 24. The output switches to $+3.2$ volts when the terminal 24 voltage is more positive than the terminal 22 voltage. Switching occurs over a very narrow range of a few millivolts. Thus switching from the low ("off") to high ("on") output state occurs when the adhydrode voltage on line 20 exceeds the variable reference voltage on line 18. By choosing an appropriate reference voltage, the adhydrode signal voltage accurately controls the output of differential comparator 26. Output terminal 58 is applied to the control terminal of a switch means 4. The latter device completes the charging circuit to apply charging current to the bank of batteries 2 when the differential comparator 26 is "off" and opens the circuit when the comparator is "on." Through this arrangement a predetermined adhydrode signal level shuts off charging to the bank of batteries 2. Switch means 4 can be any type single-pole single-throw switching device responsive to the "on"-"off" output of differential comparator 26. For example, switch means 4 could be a totally solid-state switching arrangement or could include a relay.

Obviously, numerous modifications and variations of the present invention are possible in light of the above teachings. For example, differential comparator 26 may be any device capable of providing a two level output in response to the relative magnitudes of two input signals. In addition, one or several comparators may be employed in conjunction with different cells and the comparator output may be arranged in various logical combinations ("AND" and "OR," for example) so that battery charging terminates when all or one of the monitored batteries reaches a predetermined adhydrode signal level. Also it should be apparent to those of ordinary skill in the art that one or several batteries may be under charge and only those being monitored are required to have a third-electrode. Also, it is apparent that the cell charging circuit may be switched on and off by any suitable switching scheme. It is therefore to be understood that within the scope of the appended claims, the invention may be practiced otherwise than as specifically described herein.

What is claimed and desired to be secured by Letters Patent is:

1. In a circuit for charging nickel-cadmium secondary cells having adhydrode electrodes providing a signal proportional to the charge conditions of the cell, the improvement comprising the combination of means for providing a variable reference voltage constantly proportional to the voltage across a selected cell, means for providing a sensing voltage proportional to said adhydrode electrode signal, means connected to said reference voltage and sensing voltage for comparing said voltages to provide a two level output signal dependent on the relative magnitudes of said voltages, and means responsive to said two level output signal to complete said charging circuits when said output signal is one of said two levels and to open said charging circuit when said output signal is the other of said two levels.

2. The combination of claim 1 wherein said comparing means is a differential comparator means.

3. The combination of claim 2 wherein said differential comparator means has a narrow switching region.

4. The combination of claim 3 wherein said means for providing a reference voltage is a resistive voltage divider means connectible across said selected cell.

5. The combination of claim 4 wherein said means for providing a sensing voltage is a resistor means connectible between the adhydrode electrode and the cadmium electrode of said selected cell.

6. The combination of claim 5 wherein said resistive voltage divider means provides a variable reference voltage.

7. In a circuit for charging nickel-cadmium secondary cells having adhydrode electrodes providing a signal proportional to the charge conditions of the cell, the improvement comprising the combination of (a) a plurality of means for providing reference voltages each proportional to the voltage across a selected cell, (b) a plurality of means for providing sensing voltages each proportional to said adhydrode electrode signal of selected cell, (c) a plurality of means each connected to said reference voltage and to said sensing voltage of each of said selected cells for comparing said voltages to provide a first two level output signal dependent on the relative magnitude of said voltages, (d) a plurality of logic gates adapted to be connected to said plurality of comparing means in a plural logic configuration and having a second two level output signal, (e) means responsive to said second two level output signal to complete said charging circuit when said output signal is one of said two levels and to open said charging circuit when said output signal is the other of said two levels.

References Cited

UNITED STATES PATENTS

| | | | |
|---|---|---|---|
| 3,477,009 | 11/1969 | Nichols | 320—39 |
| 2,988,590 | 6/1961 | Andre. | |
| 3,005,843 | 10/1961 | Jaffee | 320—46 X |
| 3,348,118 | 10/1967 | Watrous | 320—40 |
| 3,447,059 | 5/1969 | Ford et al. | 320—27 |

J D MILLER, Primary Examiner

J. M. GUNTHER, Assistant Examiner

U.S. Cl. X.R.

320—28, 40, 52